(12) United States Patent
Jeong et al.

(10) Patent No.: US 12,503,099 B1
(45) Date of Patent: Dec. 23, 2025

(54) SYSTEM AND METHOD FOR VEHICLE CONTROL

(71) Applicants: HYUNDAI MOTOR COMPANY, Seoul (KR); KIA CORPORATION, Seoul (KR)

(72) Inventors: Sunghwa Jeong, Hwaseong-si (KR); Ho Young Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/965,395

(22) Filed: Dec. 2, 2024

(30) Foreign Application Priority Data

Jun. 21, 2024 (KR) .......................... 10-2024-0081130

(51) Int. Cl.
```
B60W 30/02      (2012.01)
B60W 10/06      (2006.01)
B60W 10/11      (2012.01)
B60W 30/18      (2012.01)
```

(52) U.S. Cl.
CPC ............ *B60W 30/02* (2013.01); *B60W 10/06* (2013.01); *B60W 10/11* (2013.01); *B60W 30/18172* (2013.01); *B60W 2510/0638* (2013.01); *B60W 2510/0657* (2013.01); *B60W 2520/10* (2013.01); *B60W 2520/26* (2013.01); *B60W 2552/40* (2020.02); *B60W 2710/0666* (2013.01); *B60W 2710/1005* (2013.01)

(58) Field of Classification Search
CPC ...... B60W 30/02; B60W 10/06; B60W 10/11; B60W 30/18172; B60W 2510/0638; B60W 2510/0657; B60W 2520/10; B60W 2520/26; B60W 2552/40; B60W 2710/0666; B60W 2710/1005
See application file for complete search history.

(56) References Cited

U.S. PATENT DOCUMENTS

| | | | | |
|---|---|---|---|---|
| 2004/0230362 A1* | 11/2004 | Post, II | ................. | F02D 41/021 |
| | | | | 701/84 |
| 2017/0067557 A1* | 3/2017 | Kumazaki | ................ | B60K 6/20 |
| 2019/0308611 A1* | 10/2019 | Lee | ..................... | B60W 40/109 |
| 2020/0141485 A1* | 5/2020 | Lee | ........................ | B60W 10/06 |

FOREIGN PATENT DOCUMENTS

JP       2007113408 A   *   5/2007   ............. F02D 29/02

* cited by examiner

*Primary Examiner* — Tisha D Lewis
(74) *Attorney, Agent, or Firm* — Lempia Summerfield Katz LLC (57) ABSTRACT

A vehicle control system for driving stabilization on a low-friction road includes a driving information detector configured to detect a wheel speed of a vehicle during driving of the vehicle. The vehicle control system also includes a transmission management system (TMS) configured to operate a maximum shift stage limit logic and a shift speed relief logic of a transmission of the vehicle by preemptive response when detecting a minute wheel slip according to an analysis of the wheel speed. The vehicle control system additionally includes an engine management system (EMS) configured to control a maximum engine torque limit (ETL) and an engine torque request (ETR) limit of an engine according to a TMS-EMS cooperative control request of the TMS.

13 Claims, 6 Drawing Sheets

Prior Art

Prior Art

FIG. 4B

SYSTEM AND METHOD FOR VEHICLE CONTROL

CROSS-REFERENCE TO RELATED APPLICATION

This application claims priority to and the benefit of Korean Patent Application No. 10-2024-0081130, filed on Jun. 21, 2024, the entire contents of which are hereby incorporated herein by reference.

FIELD OF TECHNOLOGY

The present disclosure relates to a system and a method for vehicle control, and more particularly, to a system and a method for vehicle control for driving stabilization on a low-friction road.

BACKGROUND

In general, when a vehicle is driven on a low-friction road, such as a raining road, a snowy road, and/or an icy road, the vehicle may suffer from a wheel slip phenomenon in which the vehicle loses a grip force with a road surface. The wheel slip phenomenon in which the vehicle slips due to the deterioration of frictional force between the low-friction road and a tire can lead to reducing driving safety or causing an accident.

Therefore, the related art prior art inhibits a wheel slip through cooperative control that reduces the engine torque or by holding a current driving shift stage for a predetermined time in a traction control system (TCS) when the wheel slip occurs during the driving of the vehicle on the low-friction road.

However, the related art as a principle that operates wheel slip suppression control only under a condition in which the wheel slip first occurs has problems.

For example, in the related art, the shift stage is fixed at the moment of the wheel slip and cooperative control is made in a feedback (F/BACK) mode in order to reduce an engine torque. In this case, a predetermined time is required until the wheel slip of the vehicle is stabilized (i.e., until the driving is stabilized). However, there is a problem that the driver's stable driving is difficult because the vehicle can lose some of grip force with a road surface for a predetermined time. Further, upon the cooperative control in the related art, the shift stage of the vehicle is fixed, so the vehicle is driven at a higher engine RPM than a normal state, which generates large engine noise.

The above information in this Background section is only for enhancement of understanding of the background of the present disclosure and therefore it may contain information that does not form the prior art that is already known to a person of ordinary skill in the art.

SUMMARY

Embodiments of the present disclosure provide a system and a method for vehicle control, that preemptively control an engine and a transmission before operating a TCS while a vehicle is driven on a low-friction road to rapidly stabilize driving and prevent an increase in engine noise.

According to an embodiment of the present disclosure, a vehicle control system for driving stabilization on a low-friction road is provided. The vehicle control system includes a driving information detector configured to detect a wheel speed of a vehicle during driving of the vehicle. The vehicle control system also includes a transmission management system (TMS) configured to operate a maximum shift stage limit logic and a shift speed relief logic of a transmission of the vehicle by preemptive response when detecting a minute wheel slip according to an analysis of the wheel speed. The vehicle control system further includes an engine management system (EMS) configured to control a maximum engine torque limit (ETL) and an engine torque request (ETR) limit of an engine of the vehicle according to a TMS-EMS cooperative control request of the TMS.

In an embodiment, the driving information detector may collect driving information from at least one of a wheel speed sensor, a vehicle speed sensor, a slope sensor, an acceleration pedal position sensor, an engine sensor, or a shift stage sensor in real time, and deliver the collected driving information to the TMS.

In an embodiment, the TMS includes a low-friction road detection module configured to judge whether the vehicle enters the low-friction road according to a minute wheel slip detection logic using speed differences between a driving wheel and a non-driving wheel based on the wheel speed. The TMS may also include a control module configured to operate the maximum shift stage limit logic so as to transmit a driving force adapted according to a vehicle speed and a road slope condition preferentially when detecting entry into the low-friction road.

In an embodiment, the low-friction road detection module may calculate a larger value among speed differences of a left wheel and a right wheel of the driving wheel with respect to an average wheel speed of the non-driving wheel according to the minute wheel slip detection logic as a vehicle spin.

In an embodiment, the low-friction road detection module may detect the low-friction road when all conditions of maintaining a state in which the vehicle spin exceeds a target spin value defined as the minute wheel slip for a reference time are satisfied.

In an embodiment, the control module may limit a maximum shift ratio by setting a lowest stage up to any one of stages 2 to 4 without using stage 1 of the transmission when controlling the maximum shift stage limit logic.

In an embodiment, the control module may gradually weakly set the maximum shift stage limit logic as the road slope is higher, and gradually strongly set the maximum shift stage limit logic as the vehicle speed is higher.

In an embodiment, the control module may operate the shift speed relief logic in order to prevent momentary wheel slip occurrence by upshift or kickdown (k/down) which occurs while driving on the low-friction road.

In an embodiment, the control module may request the TMS-EMS cooperative control to the EMS by setting a target engine torque enabling stable driving when an additional wheel slip of a reference value or more occurs according to a driving road surface state while the maximum shift stage limit logic operates.

In an embodiment, the EMS may limit a maximum torque of the engine considering at least one of a current wheel slip amount, a current vehicle speed, a current engine RPM, and a current engine torque according to the ETL control, and limits an engine torque rise slope according to the ETR control.

According to another embodiment of the present disclosure, a vehicle control method for driving stabilization on a low-friction road is provided. The vehicle control method includes calculating, by a transmission management system (TMS), a vehicle spin according to a minute wheel slip detection logic by analyzing a wheel speed collected while driving. The vehicle control method also includes detecting a minute wheel slip by comparing the vehicle spin with a target spin value. The vehicle control method further includes operating a maximum shift stage limit logic and a shift speed relief logic of a transmission of the vehicle by preemptive response when detecting the minute wheel slip. The vehicle control method additionally includes controlling a maximum engine torque limit (ETL) and an engine torque request (ETR) limit of an engine by requesting a TMS-EMS cooperative control request to an engine management system (EMS).

In an embodiment, detecting the minute wheel slip may include counting, when the vehicle spin exceeds a target spin value, an excess time of the target spin value, and determining whether the target spin value excess time is maintained for a reference time; and detecting the minute wheel slip when the target spin value excess time is maintained for the reference time.

In an embodiment, the maximum shift stage limit logic may limit a maximum shift ratio by up-setting a lowest stage to any one of stages 2 to 4 without using stage 1 of a transmission.

In an embodiment, while the maximum shift stage limit logic operates, when an additional wheel slip of a reference value or more occurs according to a driving road surface state, the TMS-EMS cooperative control may be requested.

In an embodiment, the TMS-EMS cooperative control may include limiting a maximum torque of the engine considering at least one of a current wheel slip amount, a current vehicle speed, a current engine RPM, and a current engine torque according to the ETL control, and limiting an engine torque rise slope according to the ETR control.

According to embodiments of the present disclosure, there is an effect in that by preemptively controlling the engine and the transmission before operating the TCS when detecting a minute wheel slip according to an analysis of a wheel speed of the vehicle, a wheel slip generation amount may be rapidly performed and a TCS operating region can be reduced.

Further, there is an effect in that a driving force stabilized from an initial driving force generation step is transmitted to a driving system by sensitively detecting the minute wheel slip to prevent occurrence of the wheel slip at the initial starting of the vehicle and an early entry into the low-friction road during driving, thereby improving driving stability of a driver.

In addition, there is an effect in that by controlling limitation of a maximum shift ratio and shift speed relieving logic for stable driving force transmitted when detecting the minute wheel slip, engine noise may be reduced.

BRIEF DESCRIPTION OF THE DRAWINGS

FIGS. 3A-4B illustrate comparisons between vehicle control results for driving stabilization on a low-friction road in the related art and an embodiment of the present disclosure.

DETAILED DESCRIPTION

Hereinafter, embodiments of the present disclosure are described in detail with reference to the accompanying drawings.

The terms used in the present disclosure are used only for describing specific embodiments, and are not intended to limit the present disclosure. As used herein, the singular forms are also intended to include plural forms unless explicitly differently indicated by context. It should be appreciated that when terms "include," "including," "comprise," "comprising," or the like are used in this specification, the terms are intended to designate the existence of mentioned features, integers, steps, operations, constituent elements, and/or components, but do not exclude the existence or addition of one or more other features, integers, steps, operations, constituent elements, and components, and/or groups thereof. As used herein, the terms "and/or" include any one or all combinations of the items which are associated and listed.

Throughout the specification, terms including first, second, A, B, and the like are used for describing various constituent elements, but the constituent elements are not limited by the terms. These terms are merely intended to distinguish the components from other components, and the terms do not limit the nature, sequence, or order of the components.

Throughout the specification, it should be understood that, when it is described that a component is "connected to" or "accesses" another component, the component may be directly connected to or access the other component or a third component may be present therebetween. In contrast, it should be understood that, when it is described that a component is "directly connected to" or "directly accesses" another component, it is understood that no element is present between the component and the other component.

Throughout the specification, terms are used merely to describe specific embodiments, and are not intended to limit the present disclosure. A singular form includes a plural form if there is no clearly opposite meaning in the context.

When a component, device, element, or the like of the present disclosure is described as having a purpose or performing an operation, function, or the like, the component, device, or element should be considered herein as being "configured to" meet that purpose or perform that operation or function.

Additionally, it should be understood that one or more of the following methods or aspects thereof may be executed by one or more controllers. The term "controller" may refer to a hardware device including a memory and a processor. The memory is configured to store program instructions, and the processor is configured to execute the program instructions in order to perform one or more processes that are described below in more detail. As described here, the controller may control units, modules, parts, devices, or operations of those similar thereto. Further, as recognized by those having ordinary skill in the art, it should be understood that the following methods may be executed by a device including the controller jointly with one or more other components.

Hereinafter, a system and a method for vehicle control for driving stabilization on a low-friction road according to embodiments of the present disclosure are described in detail with reference to the accompanying drawings.

Figure 1:
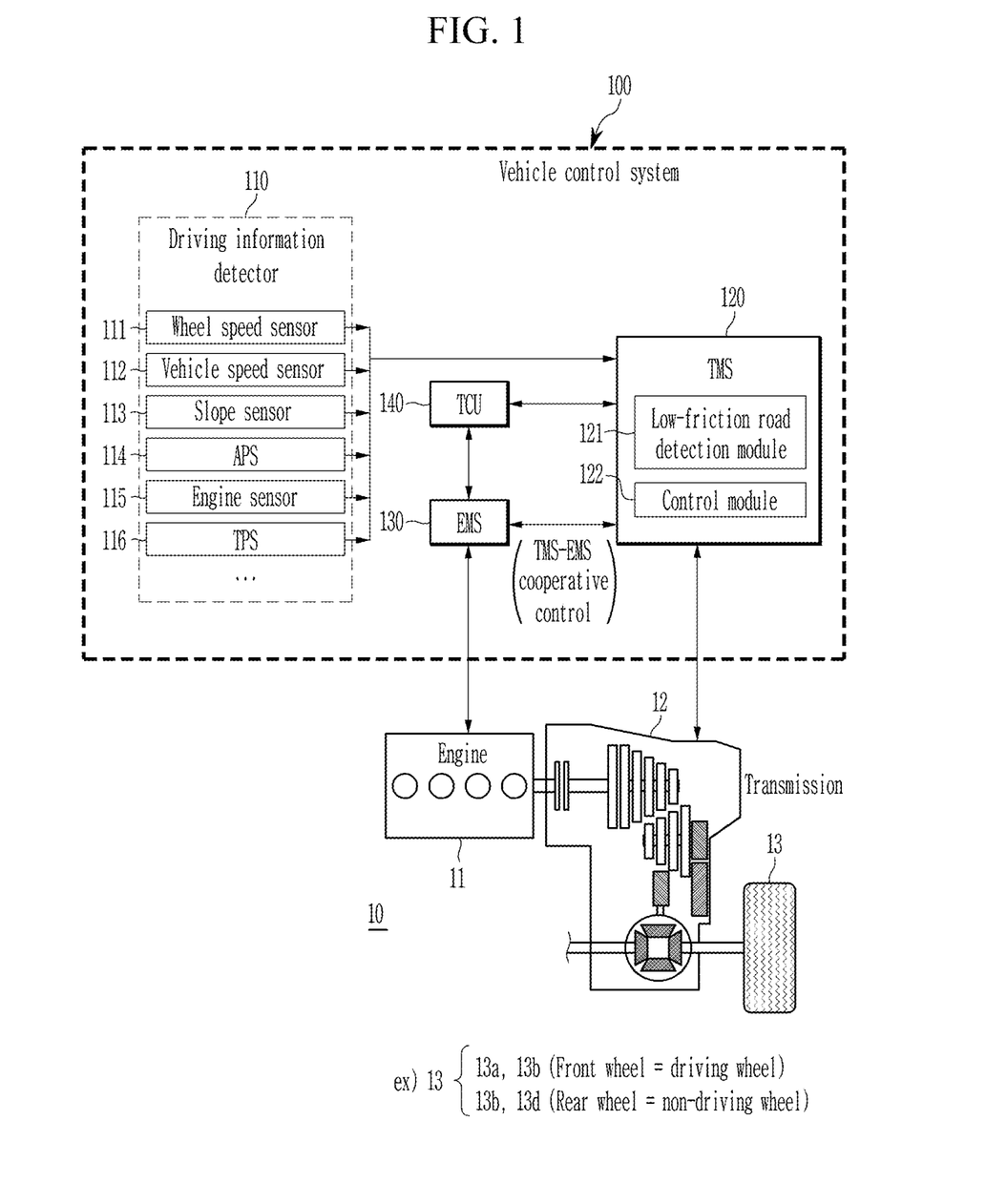
FIG. 1 schematically illustrates a configuration of a vehicle control system for driving stabilization on a low-friction road, according to an embodiment of the present disclosure.

FIG. 1 schematically illustrates a configuration of a vehicle control system for driving stabilization on a low-friction road according to an embodiment of the present disclosure.

Referring to FIG. 1, a vehicle control system 100 for driving stabilization on a low-friction road according to an embodiment of the present disclosure includes a driving information detector 110 detecting a wheel speed of a vehicle during driving of the vehicle. The vehicle control system 100 also includes a transmission management system (TMS) 120 operating a maximum shift stage limit logic and a shift speed relief logic of a transmission 12 for stable driving force transmitted by a preemptive response when detecting a minute wheel slip according to an analysis of the wheel speed. The vehicle control system 100 additionally includes an engine management system (EMS) 130 controlling a maximum engine torque limit (ETL) and an engine torque request (ETR) limit of an engine 11 according to a cooperative control request of the TMS 120.

The vehicle control system 100 may further include a traction control system (TCS) 140 that requests cooperative control for an engine 11 and the transmission 12 when a wheel slip occurs in a vehicle 10 in the related art. Cooperative control may refer to decreasing an engine torque or holding a shift stage being driven current for a predetermined time in order to inhibit the wheel slip.

According to an embodiment, the preemptive response means that the TMS 120, by detecting the minute wheel slip, operates earlier than a conventional TCS that operates only when the wheel slip of the vehicle first occurs. The TMS 120 thus performs a control for stable driving force. Further, in an embodiment, the occurrence of the wheel slip may be predicted, and preemptive control may be performed based on the prediction.

The vehicle 10 may be an internal combustion engine vehicle, a hybrid vehicle, or a mild hybrid vehicle including the traction control system (TCS) for controlling the wheel slip.

The vehicle 10 includes the engine 11 generating a driving force required for driving by combustion of fuel, the transmission 12 automatically changing a shift ratio according to a vehicle speed or an engine RPM, and four driving wheels 13 rotating by the driving force transmitted through the transmission 12.

The transmission 12 may adopt all automated transmissions such as an automatic transmission (AT), a dual clutch transmission (DCT), and an intelligent variable transmission (IVT) that are shift-controllable through the TMS 120.

The driving information detector 110 collets driving information required for controlling the driving stabilization on the low-friction road from various sensors according to the driving of the vehicle 10. For example, the driving information detector 110 may collect driving information from at least one of a wheel speed sensor 111, a vehicle speed sensor 112, a slope sensor 113, an accelerator pedal position sensor (APS) 114, an engine sensor 115, and a transmission position sensor (TPS) 116 of the vehicle 10 in real time. The driving information detector 110 may provide the collected driving information to the TMS 120.

The TMS 120 controls an overall operation for the driving stabilization of the vehicle 10 on the low-friction road according to an embodiment of the present disclosure. The TMS 120 includes at least one program and data for the control.

For example, the TMS 120 may include a low-friction road detection module 121 and a control module 122 as a detailed configuration.

The low-friction road detection module 121 may determine whether the vehicle enters the low-friction road according to the detection of the minute wheel slip by using a difference in speed between a non-driving wheel and a driving wheel according to the wheel speed. As used in the present disclosure, the minute wheel slip detection may be used to mean the low-friction road detection.

The low-friction road detection module 121 may calculate a larger value among speed differences of a left wheel and a right wheel of the driving wheel with respect to an average wheel speed of the non-driving wheel according to the minute wheel slip detection logic as a vehicle spin.

For example, a vehicle spin calculation method is described by assuming that rear wheels 13*b* and 13*d* of the vehicle 10 are non-driving wheels and front wheels 13*a* and 13*b* are driving wheels.

The low-friction road detection module 121 may calculate first and second speed differences acquired by comparing average speeds of the rear wheels 13*b* and 13*d*, and the speed of the left wheel 13*a* and the speed of the right wheel 13*b* of the front wheels, respectively, and determine a larger value among the first and second speed differences as the vehicle spin. In an example, the low-friction road detection module 121 may convert a wheel speed of an RPM unit into a speed unit of km/h, and use the speed unit of km/h for calculation.

In addition, the low-friction road detection module 121 may detect the minute wheel slip (i.e., entry into the low-friction road) when all conditions of maintaining a state in which the determined vehicle spin exceeds a target spin value defined as the minute wheel slip for a reference time are satisfied. Here, the minute wheel slip generally means a wheel slip size by which the entry into the low-friction road may be determined or predicted first before the TCS 140 operates differently from a case where the TCS 140 operates when the wheel slip occurs. In addition, the target spin value may be set with a result value acquired by test driving or a wheel spin generation tendency in a low-friction road environment such as a snowy road or an icy road by considering at least one of an engine output, a tire specification, and a vehicle communication speed of the vehicle.

The control module 122 may operate the maximum shift stage limit logic so as to transmit a driving force adapted according to a vehicle speed and a road slope condition preferentially when detecting the low-friction road. For example, when an 8-shift transmission 12 is applied to the vehicle 10, shift stages of stages 1 to 8 are generally used, and a largest driving force is generated at stage 1 (i.e., a lowest stage) among the shift stages. However, a large driving force in the low-friction road environment may adversely affect the vehicle spin.

Accordingly, the control module 122 may limit the maximum shift stage (maximum shift ratio) by setting the shift stage up to any one of stages 2 to 4 without using stage 1 (lowest stage) of the transmission 12 when controlling the maximum shift stage limit logic. The limitation may be temporarily applied while the shift stage limit logic is operating.

Further, the control module 122 may simultaneously consider the vehicle speed and the road slope condition at a time of detecting the minute wheel slip (i.e., a time of detecting the low-friction road) in the maximum shift stage limit logic. In this case, the control module 122 may set the maximum shift stage limit logic gradually weakly for a climbing performance as a road slope is higher (e.g., stages 2 and 3), and may set and use the shift stage limit logic gradually strongly as the vehicle speed is higher (e.g., stages 2 to 4). However, since a wheel spin tendency generated under the same condition depends on a developed vehicle such as the engine output/tire specification of the vehicle, final setting data may be determined as an actual test result.

The control module 122 may operate the shift speed relief logic in order to prevent momentary wheel slip occurrence by upshift or kickdown (k/down) that occurs while driving on the low-friction road.

In general, gear stage upward shift such as upshift 1-2, 2-3, 3-4, etc., occurs during starting and acceleration driving by stepping an acceleration pedal system (APS) while stopping regardless of a road surface condition. Such shifting occurs similarly even when detecting the low-friction road according to an embodiment of the present disclosure.

However, as a shift time is shorter, a probability that the wheel spin will occur on the low-friction road surface is higher.

Therefore, assuming that an upward shift control time requires 0.5 seconds (s) in a general road surface condition, the upward shift control time is relieved to require 1 s under the low-friction road detection condition according to an embodiment of the present disclosure, thereby decreasing a driving force change speed during the shift control.

Further, the kickdown shift refers to a driving state that increases an acceleration force according to an increase in engine RPM by lowering the gear stage by one stage by deeply stepping the acceleration pedal system (APS) during low-speed driving of the vehicle.

As described above, the kickdown shift is a vehicle behavior that occurs in both the general road surface condition and the low-friction road condition. Therefore, when the shift speed relief logic is operated according to an embodiment of the present disclosure, the kickdown shift is also slowly controlled, and when the kickdown shift is delivered to the vehicle wheel, the driving force change speed may be reduced (e.g., for 4-2 shift speed, 0.6 s is required→1 s is required).

Further, the control module 122 requests a TMS-EMS cooperative control to the EMS 130 when an addition wheel slip of a reference value or more occurs according to the driving road surface condition while the shift stage limit logic operates.

For example, the detection of the occurrence of the additional wheel slip is used for determining a road environment in which a larger wheel spin is generated when the vehicle enters an icy section which is more slippery while the vehicle is being driven on the snowy road, or because a state in which snow is accumulated on a road is different (e.g., first accumulated snow or snow compacted by preceding vehicles). In this case, the reference value may be set to a wheel slip value increased from the target spin value by a predetermined amount, and set through a predetermined algorithm (e.g., a program and a probability model).

The EMS 130 controls at least one of an ETL and an ETR according to the received TMS-EMS cooperative control request.

In this case, the EMS 130 may limit a maximum torque of the engine 11 considering at least one of a current wheel slip amount, the current vehicle speed, the current engine RPM, or the current engine torque according to the control of the ETL.

Further, the EMS 130 may limit a torque rise slope of the engine 11 according to the control of the ETR.

In embodiments of the present disclosure, at least some of components of the vehicle control system 100 may operate in cooperation with each other for a vehicle control method for driving stabilization on the low-friction road according to embodiments of the present disclosure described below.

For example, the driving information detector 110 and the TMS 120, and the EMS 130 configured in the vehicle control system 100 may be implemented as one or more processors which operate by a set program, and the set program may be programmed to perform each step of the vehicle control method for driving stabilization on the low-friction road according to an embodiment of the present disclosure.

A vehicle control method for driving stabilization on the low-friction road, according to an embodiment, is described in more detail below with reference to FIG. 2. For illustrative purposes, the vehicle control method is described as being performed using the TMS 120.

Figure 2:
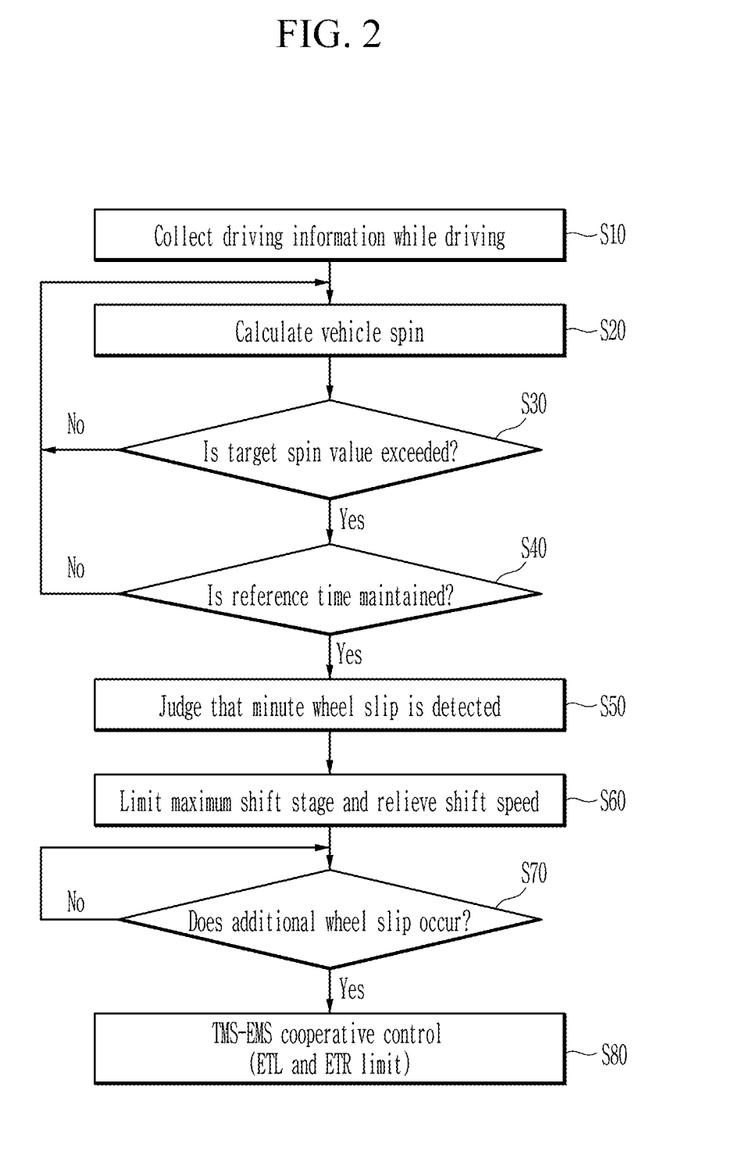
FIG. 2 is a flowchart schematically illustrating a vehicle control method for driving stabilization on a low-friction road, according to an embodiment of the present disclosure.

FIG. 2 is a flowchart schematically illustrating a vehicle control method for driving stabilization on a low-friction road, according to an embodiment of the present disclosure.

Referring to FIG. 2, in an operation S10, the TMS 120 of the vehicle control system 100 according to an embodiment of the present disclosure collects driving information according to driving of a vehicle 10 from a driving information detector 110. The driving information may include a front/rear wheel speed, a vehicle speed, a road slope, an APS value, an engine RPM, an engine torque, etc., of the vehicle 10. Other driving information is not mentioned above, but the driving information may further include known sensing information that is measurable in order to check a driving state.

In an operation S20, the TMS 120 calculates a vehicle spin according to a minute wheel slip detection logic by analyzing a wheel speed collected as the driving information. In an operation S30, the TMS 120 monitors whether a minute wheel slip of the vehicle 10 is detected by comparing the vehicle spin with a target spin value.

In an embodiment, in the operation S20, the TMS 120 calculates a larger value among speed differences of a left wheel and a right wheel of a driving wheel with respect to an average wheel speed of a non-driving wheel according to the minute wheel slip detection logic as the vehicle spin.

In this case, when the calculated vehicle spin exceeds the target spin value (Yes in the operation S30), the TMS 120 counts a time for which the calculated vehicle spin exceeds the target spin value, and determines whether the target spin value excess time is maintained for a reference time in an operation S40. In an operation S50, when the target spin value excess time is maintained for the reference time (Yes in the operation S40), the TMS 120 judges that the minute wheel slip is detected.

Accordingly, the TMS 120 detects a low-friction road when a state in which the vehicle spin exceeds the target spin value defined as the minute wheel slip is maintained for the reference time. On the other hand, when the vehicle spin does not exceed the target spin value (No in the operation S30) or when the target spin value excess state is not maintained for the reference time (No in the operation S40), the TMS 120 judges that the minute wheel slip is not detected, and returns to the operation S10.

In an operation S60, the TMS 120 controls maximum shift stage limitation and shift speed relief of the transmission 12 by preemptive response for stable driving force transmitted when detecting the minute wheel slip.

In an operation S70, the TMS 120 determines whether an additional wheel slip occurs by continuously calculating the vehicle spin. When the additional wheel slip does not occur (No in the operation S70), the TMS 120 maintains current maximum shift stage limitation and shift speed relief.

On the other hand, when an addition wheel slip of a reference value or more occurs according to a driving road surface condition while the shift stage limit logic operates (Yes in the operation S70), the TMS 120 requests a TMS-EMS cooperative control to the EMS 130 in an operation S80.

In this case, the TMS 120 operates at least one of an ETL and an ETR of the EMS 130 through the TMS-EMS cooperative control request to limit a maximum torque of the engine 11 and/or limit a torque rise slope of the engine 11.

In this case, the TMS 120 intends not to be generated larger than a current wheel slip according to a wheel slip amount, a vehicle speed, an engine RPM, and an engine torque calculated based on real-time driving information, and finally sets a target engine torque so that the vehicle may be driven with the wheel speed of the non-driving wheel and the wheel speed of the driving wheel to have a similar value as possible. In addition, the TMS 120 may load the target engine torque set upon the TMS-EMS cooperative control request, and deliver the target engine torque to the EMS 130.

Accordingly, the EMS 130 may output a final engine torque by reflecting the target engine torque upon the TMS-EMS cooperative control.

Thereafter, although omitted in the drawings, when the wheel slip applied to the related art occurs, the TMS 120 may reduce an engine torque for suppressing the wheel slip or hold a shift stage which is currently driven for a predetermined time through cooperative control of the engine 11 and the transmission 12.

FIGS. 3A-B and 4A-B illustrate a comparison between vehicle control results for driving stabilization on the low-friction road in the related art and an embodiment of the present disclosure.

Figure 3A:
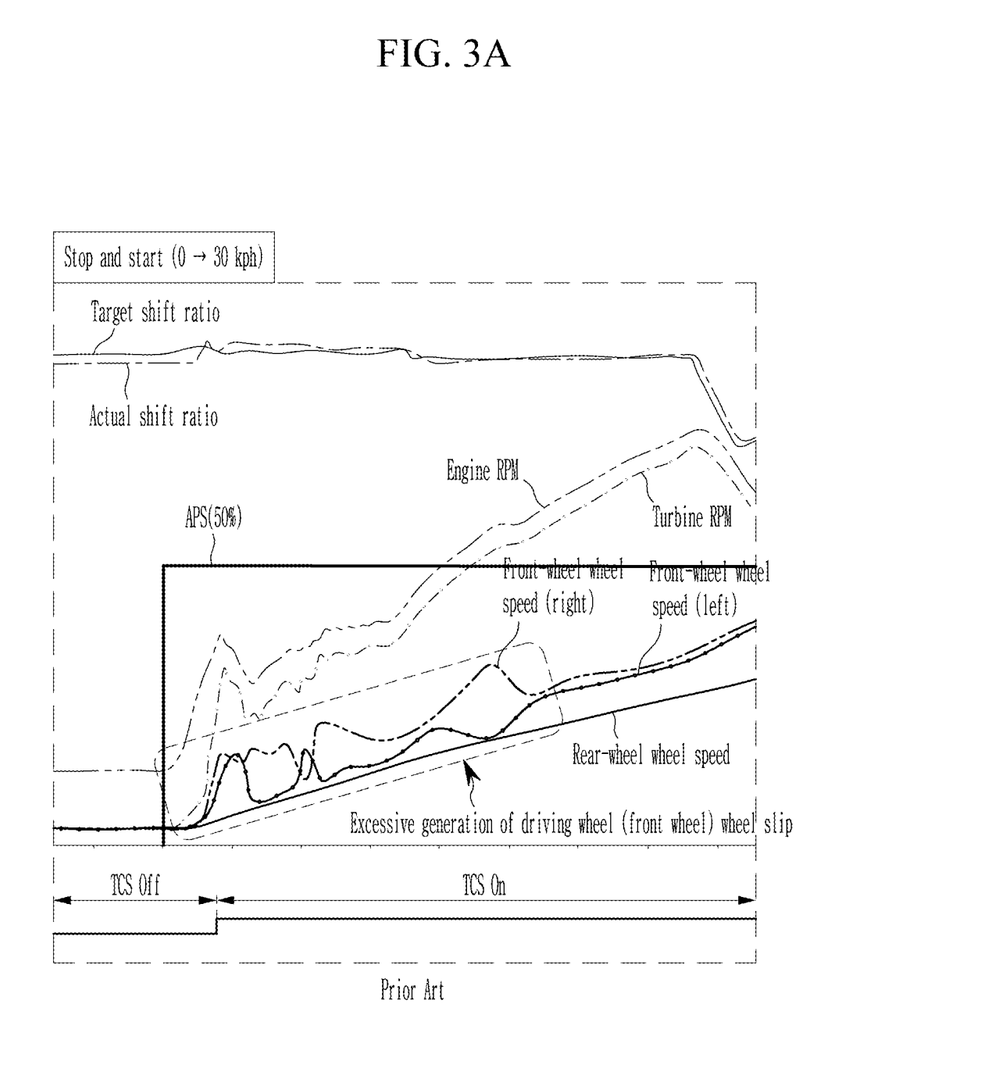
Figure 3B:
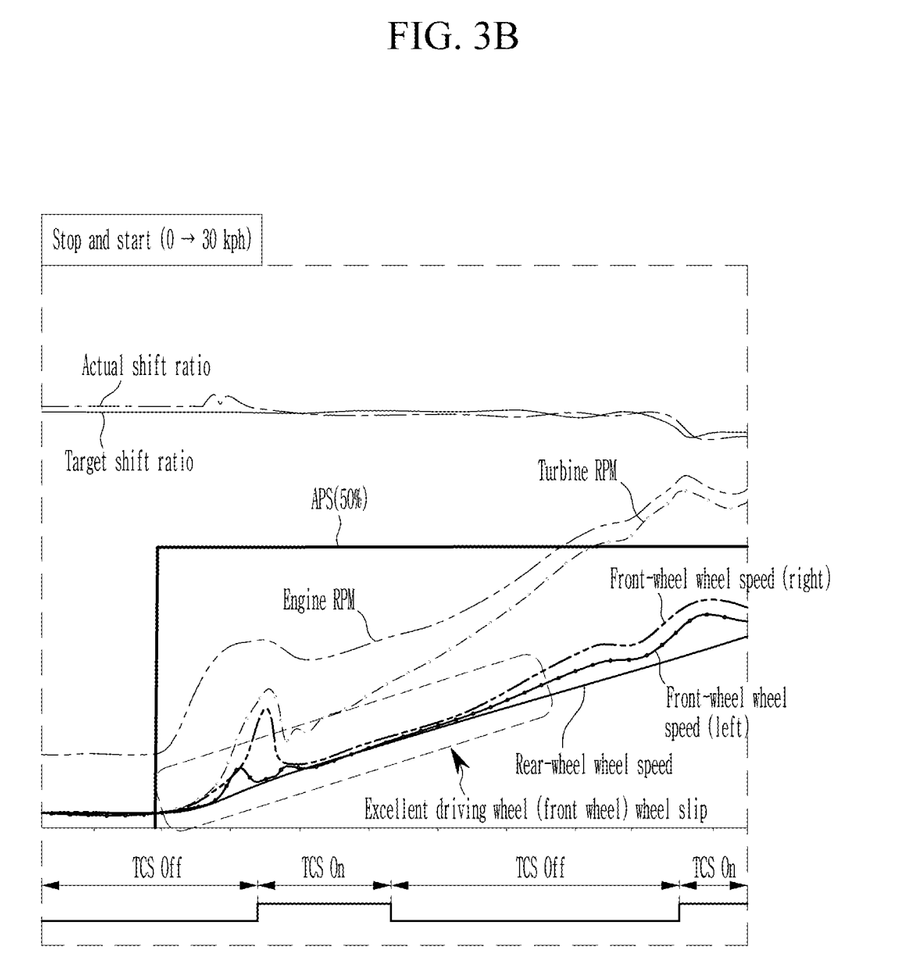
Figure 4A:
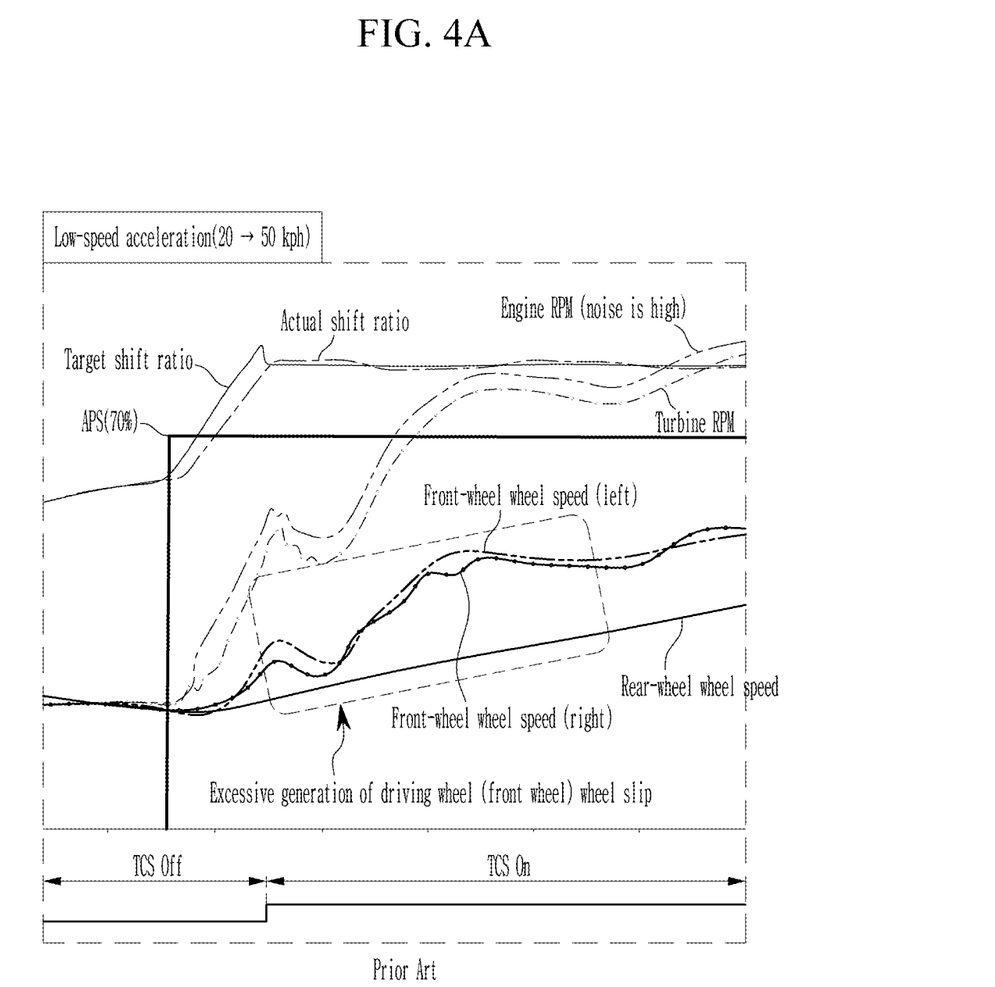
Figure 4B:
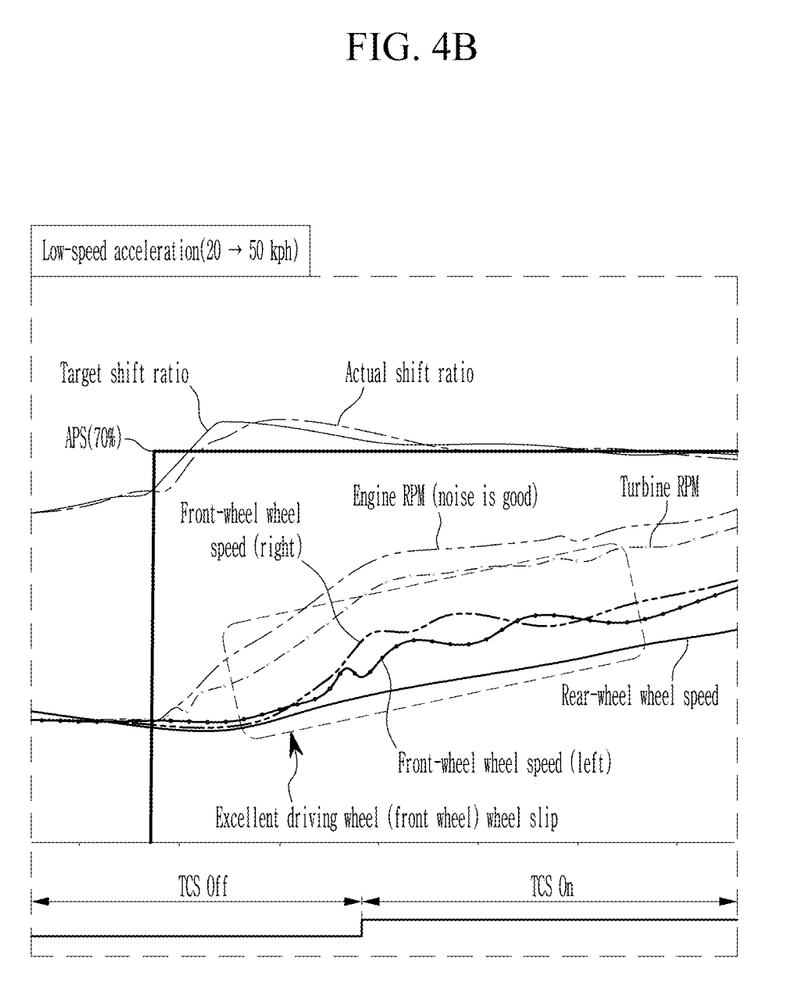

Referring to FIGS. 3A and 3B, a vehicle control result of a test of low-friction road stop and start in a vehicle using TCS of the related art and a vehicle using TMS-EMS cooperative control according to the present disclosure, respectively, are shown Referring to FIGS. 4A and 4B, a vehicle control result of a test of low-speed acceleration situations in a vehicle using TCS of the related art and a vehicle using TMS-EMS cooperative control according to the present disclosure, respectively, are shown.

In this case, the related art is a principle in which the wheel slip suppression control operates only when the wheel slip occurs first, so the wheel slip of the driving wheel (e.g., the front wheel) is excessively generated for a predetermined time until the wheel slip is stabilized. Further, the related art has a problem in that the shift stage of the vehicle is held upon cooperative control for wheel slip suppression, so engine noise is caused while the vehicle is driven at a higher RPM than a normal state.

On the other hand, in the vehicle control method according to embodiments of the present disclosure, there is an effect in that by preemptively controlling the engine and the transmission before operating the TCS when detecting a minute wheel slip according to an analysis of a wheel speed, a wheel slip generation amount may be rapidly reduced and a TCS operating region may be reduced.

Further, there is an effect in that a driving force stabilized from an initial driving force generation step is transmitted to a driving system by sensitively detecting the minute wheel slip to prevent occurrence of the wheel slip in initial starting of the vehicle and an early entry into the low-friction road during driving, thereby ensuring driving stability of a driver.

In addition, there is an effect in that by controlling limitation of a maximum shift ratio and shift speed relieving logic for stable driving force transmitted when detecting the minute wheel slip, engine noise can be reduced.

The embodiments of the present disclosure may be implemented not only through the above-described apparatus and/or method, but may also be implemented through a program for implementing functions corresponding to the configuration of the embodiment of the present disclosure, a recording medium on which the program is recorded, and the like. The present disclosure may be readily implemented by those having ordinary skill in the art from the description of the example embodiments provided above.

While the present disclosure has been described in connection with what is presently considered to be practical embodiments, it should be understood that the disclosure is not limited to the described embodiments, but, on the contrary, is intended to cover various modifications and equivalent arrangements included within the spirit and scope of the appended claims.

What is claimed is:

1. A vehicle control system for driving stabilization on a low-friction road, the vehicle control system comprising:
    a driving information detector configured to detect a wheel speed of a vehicle during driving of the vehicle;
    a transmission management system (TMS) configured to operate a maximum shift stage limit logic and a shift speed relief logic of a transmission of the vehicle by preemptive response when detecting a wheel slip according to an analysis of the wheel speed, wherein the TMS includes
        a low-friction road detection module configured to determine whether the vehicle enters low-friction road according to a wheel slip detection logic using speed differences between a driving wheel and a non-driving wheel based on the wheel speed, and
        a control module configured to operate the maximum shift stage limit logic to transmit a driving force adapted according to a vehicle speed and a road slope condition when detecting entry into the low-friction road; and
    an engine management system (EMS) configured to control a maximum engine torque limit (ETL) and an engine torque request (ETR) limit of an engine of the vehicle according to a TMS-EMS cooperative control request of the TMS.

2. The vehicle control system of claim 1, wherein the driving information detector is configured to:
    collect driving information from at least one of a wheel speed sensor, a vehicle speed sensor, a slope sensor, an acceleration pedal position sensor, an engine sensor, or a shift stage sensor in real time; and
    provide the collected driving information to the TMS.

3. The vehicle control system of claim 1, wherein the low-friction road detection module is configured to calculate a larger value among speed differences of a left wheel and a right wheel of the driving wheel with respect to an average wheel speed of the non-driving wheel according to the wheel slip detection logic as a vehicle spin.

4. The vehicle control system of claim 3, wherein the low-friction road detection module is configured to detect the low-friction road when all conditions of maintaining a state in which the vehicle spin exceeds a target spin value defined as the wheel slip for a reference time are satisfied.

5. The vehicle control system of claim 1, wherein the control module is configured to limit a maximum shift ratio by up-setting a lowest stage to one of stages 2 to 4 without using stage 1 of the transmission when controlling the maximum shift stage limit logic.

6. The vehicle control system of claim 5, wherein the control module is configured to:

gradually weakly set the maximum shift stage limit logic as a road slope becomes higher; and gradually strongly set the maximum shift stage limit logic as the vehicle speed becomes higher.

7. The vehicle control system of claim 1, wherein the control module is configured to operate the shift speed relief logic in order to prevent momentary wheel slip occurrence by kickdown (k/down) or upshift that occurs while driving on the low-friction road.

8. The vehicle control system of claim 1, wherein the control module is configured to request the TMS-EMS cooperative control to the EMS by setting a target engine torque enabling stable driving when an additional wheel slip of a reference value or more occurs according to a driving road surface state while the maximum shift stage limit logic operates.

9. The vehicle control system of claim 1, wherein the EMS is configured to:
- limit a maximum torque of the engine considering at least one of a current wheel slip amount, a current vehicle speed, a current engine RPM, or a current engine torque according to the ETL control; and
- limit an engine torque rise slope according to the ETR control.

10. A vehicle control method for driving stabilization on a low-friction road, the vehicle control method comprising:
- calculating, by a transmission management system (TMS), a vehicle spin according to a wheel slip detection logic by analyzing a wheel speed collected during driving of a vehicle;
- detecting a wheel slip by comparing the vehicle spin with a target spin value;
- operating a maximum shift stage limit logic and a shift speed relief logic of a transmission of the vehicle by preemptive response when detecting the wheel slip; and
- controlling a maximum engine torque limit (ETL) and an engine torque request (ETR) limit of an engine of the vehicle by requesting a TMS-EMS cooperative control to an engine management system (EMS), wherein detecting the wheel slip includes:
- counting, when the vehicle spin exceeds a target spin value, an excess time of the target spin value;
- determining whether the target spin value excess time is maintained for a reference time; and
- detecting when the target spin value excess time is maintained for the reference time.

11. The vehicle control method of claim 10, further comprising limiting, according to the maximum shift stage limit logic, a maximum shift ratio by setting a lowest stage up to any one of stages 2 to 4 without using stage 1 of a transmission.

12. The vehicle control method of claim 10, wherein, while the maximum shift stage limit logic operates, requesting the TMS-EMS cooperative control when an additional wheel slip of a reference value or more occurs according to a driving road surface state.

13. The vehicle control method of claim 10, wherein the TMS-EMS cooperative control includes;
- limiting a maximum torque of the engine considering at least one of a current wheel slip amount, a current vehicle speed, a current engine RPM, and a current engine torque according to the ETL control; and
- limiting an engine torque rise slope according to the ETR control.

* * * * *